3,264,051
MOTION PICTURE FILM VIEWING APPARATUS
Charles C. Melton, Prescott, Ariz., assignor to Argus Incorporated, Chicago, Ill., a corporation of Delaware
Filed Aug. 9, 1963, Ser. No. 301,704
7 Claims. (Cl. 352—129)

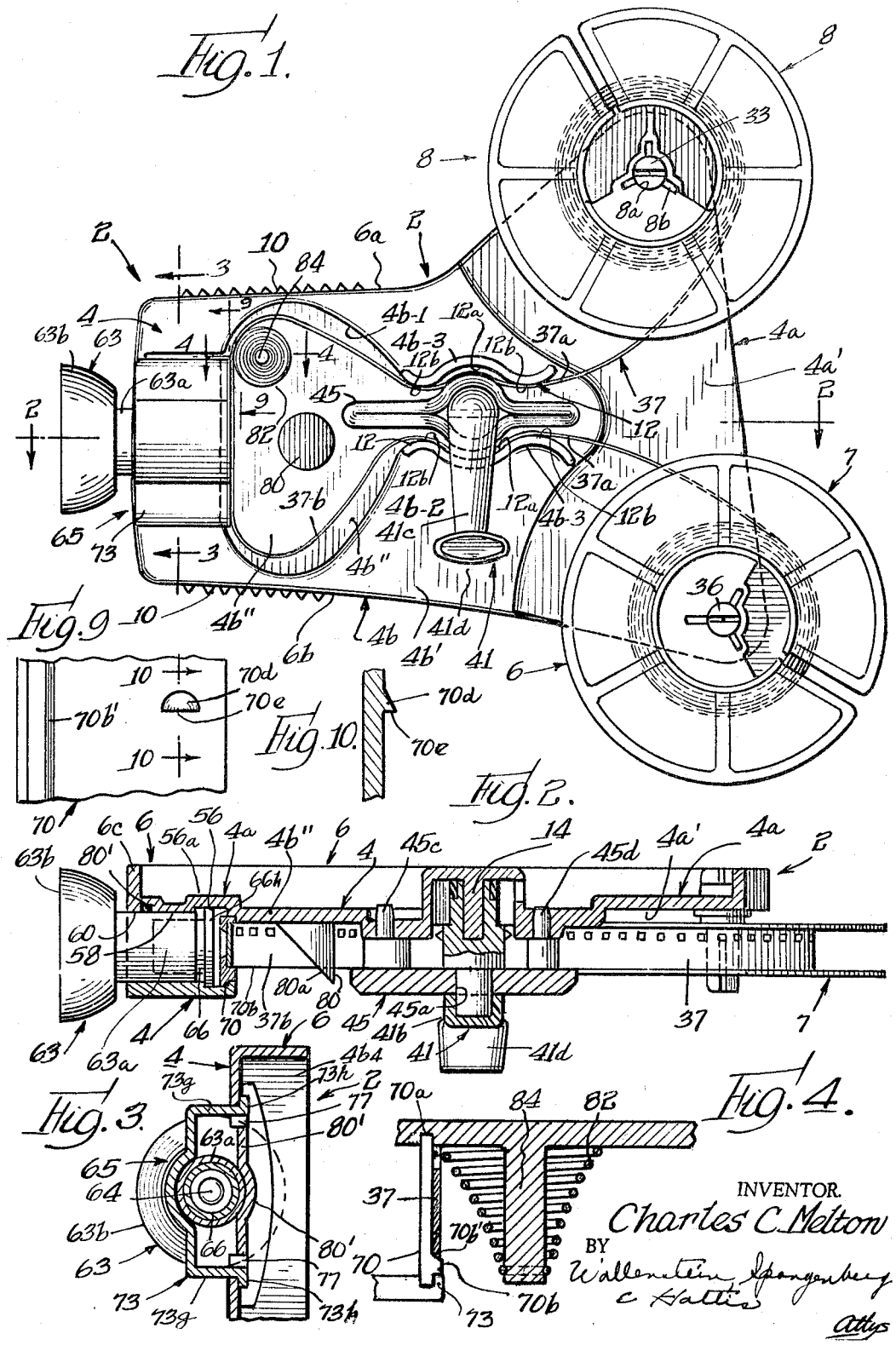

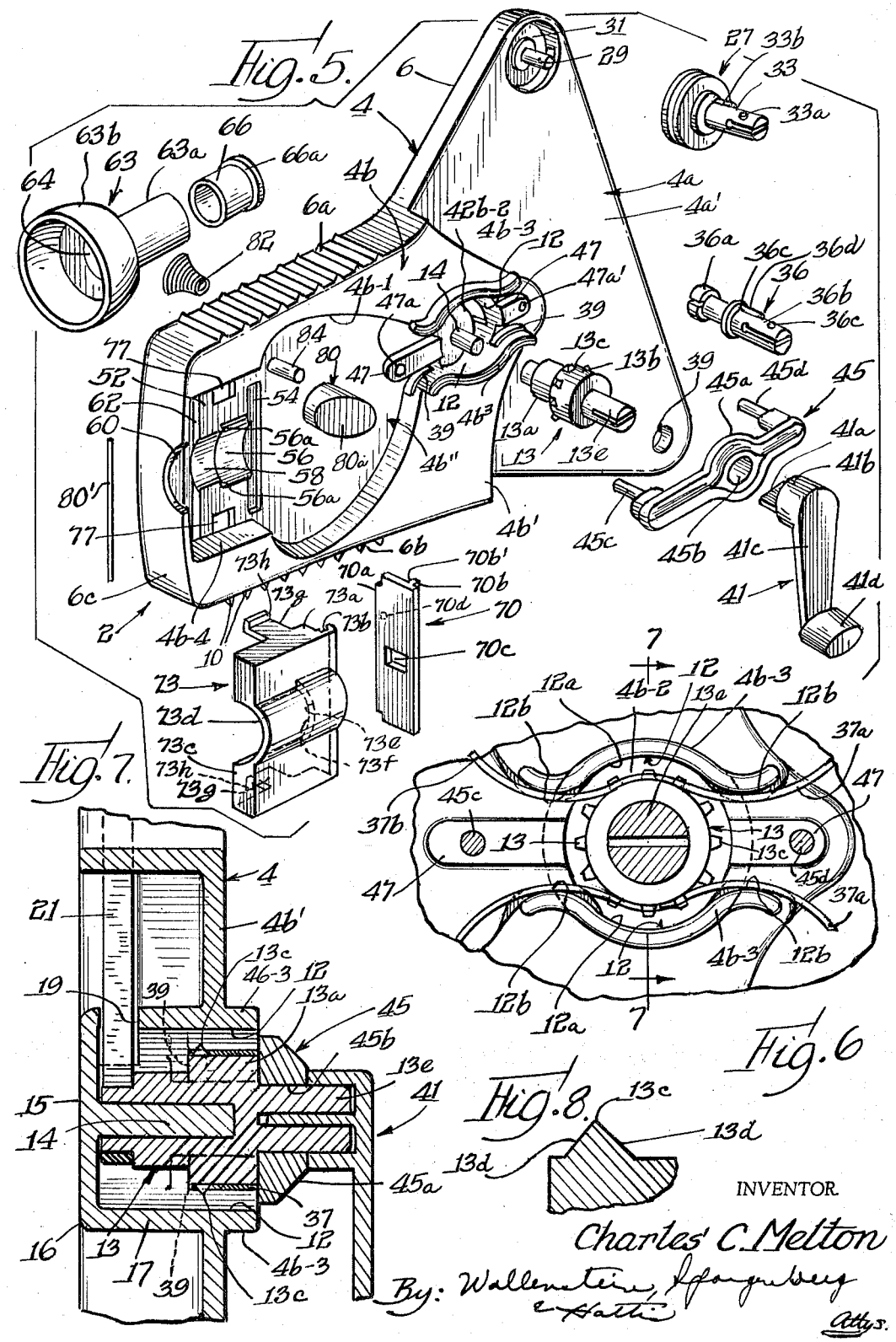

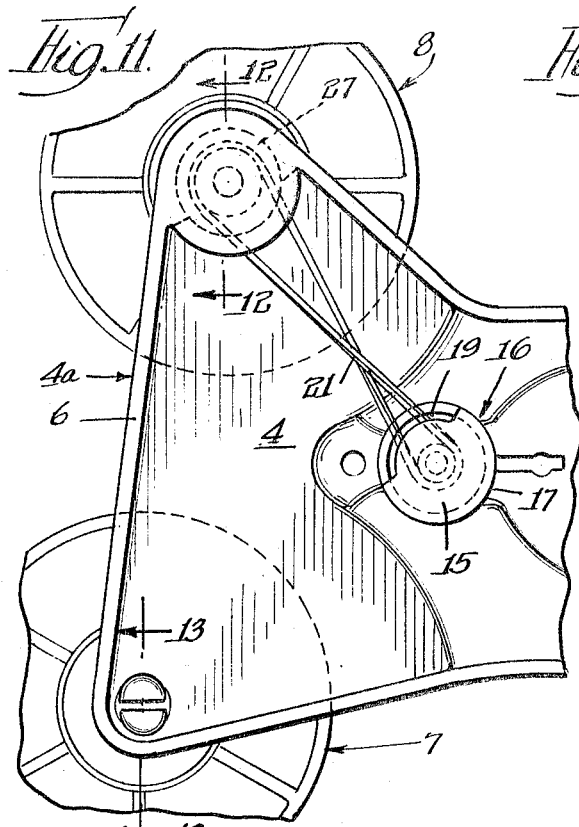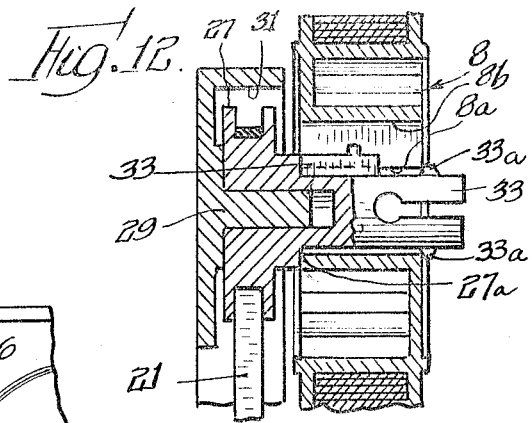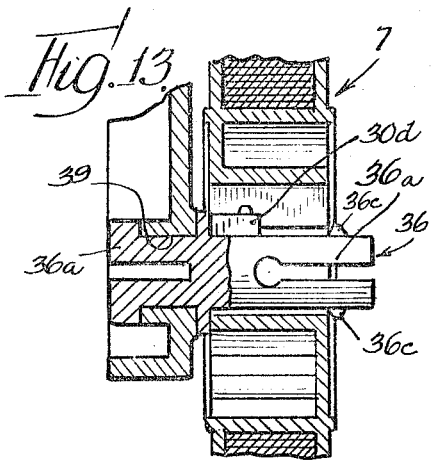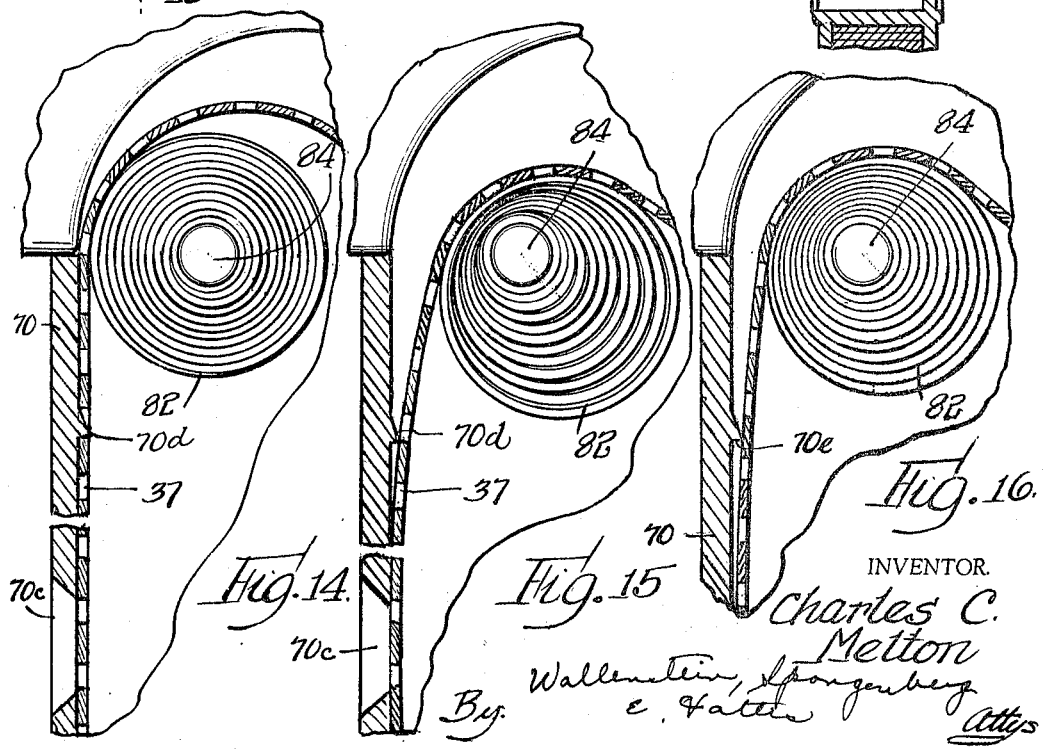

This invention relates to movie film viewing apparatus. Many of the feautres of the invention have particular utility in manually operable movie film viewers, although some of the features thereof have a broader application.

Attempts have been made to design manually operable movie film viewers which are reliable in operation and yet are priced to sell for an extremely low cost. The difficulty of accomplishing this objective lies in the fact that movie film viewers must carry out relatively complex functions, such as advancing the film one frame at a time in a step-by-step movement past a viewing window as a manually operated handle is continuously operated. Also, to have a mass market appeal, they should be easy to load with film and operate.

Accordingly, one of the objects of the invention is to provide a manually operable movie film viewer which is inexpensive to construct and yet is reliable in operation. A related object of the invention is to provide a manually operable movie film viewer which is made of a minimum number of parts. A still further related object of the invention is to provide a movie film viewer as described wherein the movie film can be threaded through the device without difficulty by persons having only average manual dexterity and little or no experience operating movie film projectors.

Another object of the invention is to provide a movie film viewer preferably as described which has a film track at the viewing station thereof which does not require a clamp or the like for holding the film in place on the film track.

A further object of the invention is to provide a simple and inexpensive means for intermittently advancing the film one frame at a time past the viewing window as a manually operated film-feeding handle is continuously operated, such means preferably including only a single movable part, such as a compressible spring.

Another object of the invention is to provide a uniquely designed film-feeding sprocket wheel for a movie film viewer projector or the like which, in cooperation with associated film guiding surfaces, enables perforated movie film to be engaged with the teeth of the sprocket wheel without the need for careful positioning of the film with respect to the sprocket wheel teeth. A related object of the invention is to enable the placement of perforated movie film into engagement with the sprocket wheel teeth by merely passing the film edgewise into a narrow slot.

In the most preferred form of movie film viewer of the present invention, the viewer has a body or housing which may be made of a plastic material having a vertically oriented or upstanding support wall with horizontally extending peripheral flanges which may be comfortably grasped with the left hand of the user. A pair of vertically spaced reel support posts extending horizontally from the right side and rear (relative to the user's frame of reference) of the support wall respectively rotatably support film supply and take-up reels. A lens containing eyepiece is mounted at the forward end of the viewer body, the eyepiece being in alignment with a viewing window formed in an upwardly extending and rearwardly facing film track-forming wall at the front of the body member. The film track-forming wall forms a film track which is exposed for its full length and forms the front defining wall of a semi-hour glass-shaped, film loop-receiving recess formed in the right hand side and front portion of the support wall. This recess outlines the general shape of a free loop formed in the unwound section of the film extending between the supply and take-up wheels. The front end of the free loop in the film is placed against the film track-forming wall so that the resilinecy thereof forces the same against the film track-forming wall to maintain it in a consistent plane at the viewing window therein.

A light source is positioned in the central portion of the film loop-receiving recess, the light source preferably comprising a white colored inclined surface adapted to reflect ambient light through the viewing window of the film track-forming wall and into the eyepiece.

The rear of the film loop-receiving recess terminates in a pair of confronting vertically spaced guide wall surfaces which hold the opposed sections of the film at the rear of the free loop in contiguous, confronting relation. The confronting sections of the film engaging the latter guide wall surfaces extend rearwardly around opposite sides of a sprocket wheel, and then outwardly around another pair of confronting vertically spaced guide wall surfaces where they extend outwardly to the supply and take-up reels.

The aforementioned pairs of guide wall surfaces and the associated sprocket wheel define therebetween a pair of narrow, arcuate, film-receiving slots into which the confronting sections of the film are moved edgewise into position around the sprocket wheel. The sprocket wheel has film-engaging teeth each having an outwardly sharply tapering transverse profile (that is the profile viewed in a plane passing through the axis of the sprocket wheel). These transversely tapered teeth guide or cam the sections of film passed edgewise into said film-receiving slots under tension into position where the sprocket wheel teeth pass into the perforations of the film. The transversely tapered teeth also permit the film to be readily removed from the sprocket wheel by merely pulling the film sections edgewise through the film-receiving slots, the sharply tapering sides of the teeth acting as guide surfaces which permit the film to be readily slid off the teeth. The film sections inserted into the film-receiving slots are placed under tension by the relationship of the periphery of the sprocket wheel and the guide wall surfaces referred to, as will be explained in detail later on in the specification. The unique design of the sprocket wheel teeth and their relationship to the guide wall surfaces form an aspect of the invention which is useful in many types of perforated strip feeding devices.

As the sprocket wheel is rotated, the teeth thereof pull on the section of the film constituting one-half of the free loop referred to and push on the section of the film forming the other half of the free loop. Coupling means such as a rubber band is connected between an extension on the sprocket wheel and the take-up reel-receiving post so that the latter post and sprocket wheel move together to wind the film on the take-up reel as the sprocket wheel is rotated manually as by a crank handle attached to the sprocket wheel.

The means for constraining the film to move in an intermittent manner along the film track as the sprocket wheel is continuously rotated comprises a small stationary film holding nipple projecting from the film track-forming wall near the outlet end thereof, which nipple normally engages the trailing edge of a film perforation to prevent the film from moving along the film track-forming wall. A spring, preferably a conical spring press fitted over a post extending from the body member support wall, receives the section of the free loop of film leaving the outlet end of the film track-forming wall. When the sprocket wheel is advanced in a forward direction, the pull on one side of the film loop progressively compresses the conical spring as long as the film remains impaled on the film holding nipple. As the spring progressively contracts, the film progressively pulls away from the outlet end of the film track-forming wall. When the spring is compressed beyond the point where the film holding nipple remains in the film perforation, the spring immediately returns to its initial expanded position and, in so doing momentarily, advances the film one frame length along the film track-forming wall before a film perforation again passes over the film holding nipple.

The construction of the movie film viewer just described may be made of only a few rugged, inexpensive parts which are mostly molded plastic parts which do not have to be made to very close tolerances to operate reliably, surprisingly though it may seem. Tolerances of the order ±.005", for example, are ample for even the film holding tongue.

Other objects, advantages and features of the invention will become apparent upon making reference to the specification to follow, the claims and the drawings wherein:

FIG. 1 is a vertical side elevation of a movie film viewer constituting the preferred form of the present invention;

FIG. 2 is a horizontal section through the movie viewer of FIG. 1, taken substantially along the line 2—2 thereof;

FIG. 3 is a transverse vertical section through the movie film viewer of FIG. 1, taken substantially along the line 3—3 thereof;

FIG. 4 is an enlarged fragmentary section through a portion of the movie film viewer of FIG. 1, taken substantially along the line 4—4 thereof;

FIG. 5 is an exploded view of all of the parts making up the movie film viewer of FIG. 1;

FIG. 6 is an enlarged fragmentary section through FIG. 2, taken substantially along the lines 6—6 thereof, and shows the relationship between the sprocket wheel and adjacent film guide wall surfaces with the confronting sections of the film passing thereover;

FIG. 7 is a transverse section through the portion of the viewer shown in FIG. 6, taken substantially along the line 7—7 thereof;

FIG. 8 is an enlarged transverse section through one of the sprocket wheel teeth shown in FIGS. 6 and 7;

FIG. 9 is a view of the outlet end of the film track-forming wall, taken along the line 9—9 in FIG. 1;

FIG. 10 is a transverse section through the film track-forming wall, taken substantially along the line 10—10 in FIG. 9;

FIG. 11 is a fragmentary side elevational view of the movie film viewer of the invention showing the manner in which the sprocket wheel and the take-up reel-receiving post are coupled together;

FIG. 12 is an enlarged sectional view through the supply reel section of the viewer, taken substantially along the line 12—12 in FIG. 11;

FIG. 13 is an enlarged sectional view through the take-up reel section of the viewer, taken substantially along the line 13—13 in FIG. 11; and FIGS. 14-16 are enlarged sectional views through the outlet end of the film track-forming wall of the viewer showing respectively the positions of the film during three different degrees of compression of the conical spring, one (FIG. 14) when the spring begins to be compressed, one (FIG. 15) just as the spring reaches the point of maximum permitted compression, and one (FIG. 16) as the spring is in the process of returning to its fully expanded state where the film is being pulled along the film track.

Referring now to the drawings, the movie film viewer illustrated therein includes a body generally indicated by reference numeral 2 which has a stepped vertical mounting or support wall 4 which terminates in peripheral side walls 6 extending completely around the body member and terminating in a common vertical plane at the left hand side of the body member when viewed from the front thereof (i.e. the left hand end as viewed in FIG. 1). The support wall 4 has a rear section 4a having a right outer surface or side 4a'. In a manner to be explained, a supply reel 7 and a take-up reel 8 are supported in vertically spaced relation over the wall surface 4a', as best shown in FIG. 1. The support wall 4 has a reduced forward section 4b having a generally rectangular front portion and a rearwardly projecting rear portion. The side wall portions 6a and 6b extending from the top and bottom of the front section 4b of the support wall 4 have knurling 10 thereon so that the viewer body can be readily held in the left hand with the thumb engaging the knurling 10 on the bottom of the viewer body and the other fingers grasping the knurling 10 at the top of the viewer body. The front section 4b of the support wall 4 of the viewer body has a raised peripheral portion 4b' in a plane spaced outwardly of the outer surface 4a' of the rear section 4a thereof and a recessed central portion 4b''. The recessed central portion forms a semi-hour glass-shaped loop-receiving recess 4b–1 joining at the narrow rear end there of a narrow recess 4b–2 defined by a pair of spaced confronting guide wall surfaces 12—12. A pair of ridges 4b–3 and 4b–3 delineate the outlines of the guide wall surfaces 12—12.

Each confronting guide wall surface 12 has a concave central portion 12a which merge at the ends thereof with a pair of convexly curved film engaging end portions 12b—12b. The confronting concave portions 12a—12a of the guide wall surfaces 12—12 define a segmental circular opening which receives a sprocket wheel 13. A post 14 extends axially of the segmental circular space from the end wall 15 of a central hub 16 (FIG. 7), the wall 15 lying in the same plane as the edges of the side walls 6 of the viewer body. The hub 15 has a cylindrical side wall 17 which has an arcuate rubber band-receiving opening 19.

The post 14 is adapted rotatably to receive thereover the hub portion 13a of the sprocket wheel 13. A rubber band 21 extends around the hub portion 24a of the sprocket wheel to a grooved wheel 27 rotatably mounted around a post 29 extending within a recess 31 at the upper rear corner of the viewer body. The grooved wheel 27 has a split reel-receiving post 33 extending outwardly therefrom which receives the take-up reel 8 thereon. The post 33 has a pair of locking nibs 33a—33a for ensuring a snug fit between the reel opening 8a which receives the post. An axially projecting key 33b also extends from the post 33 for engaging in a slot 8b which may be provided in the reel 8.

A supply reel-receiving post 36 having a split head portion 36a is provided, the latter head portion snap fitting into a small circular opening 39 at the lower rear end of the body member. The post 36 is rotatably within the opening 39. The post 36 has a split reduced supply reel-receiving end portion 36b which has a pair of holding nibs 36c—36c and an axially extending key 36d which, like the corresponding nibs 33a and key 33b on the take-up reel-receiving post hold the associated reel 7 immovably with respect thereto.

The sprocket wheel 13 has a main cylindrical central portion 13b whose periphery extends substantially beyond a line extending between the pair of film engaging end portions 12b—12b of the guide wal lsurfaces 12—12 on each side thereof, as best seen in FIG. 6. There is defined between the enlarged central portion 13b of the sprocket wheel and the guide wall surfaces 12—12 a pair of narrow film-receiving slots or passages into which confronting sections 37a—37a of the film 37 extending from the supply and take-up reels 7 and 8 extend. The film 37 expands outwardly into the semi-hour glass-shaped recess 4b–1 to form the free loop 37b. The central portion 13b of the sprocket wheel bows the confronting sections of the film outwardly shown in FIG. 6 and in so doing places the film under tension for reasons to be explained.

One of the most important features of the invention is the design of the teeth 13c projecting from the enlarged portion 13b of the sprocket wheel 13. These teeth are positioned to enter the perforations of the confronting sections 37a—37a of the film and, upon clockwise rotation of the sprocket wheel, draw on the section 37a of film extending rearwardly over the top of the sprocket wheel momentarily to contract the upper portion of the free loop 37b of the film and to push forwardly on the section 37a of the film extending forwardly beneath the sprocket wheel momentarily to expand the lower portion of the free loop 37b. The sprocket wheel teeth 13c viewed in transverse section (i.e. viewed in a plane passing through the axis of rotation of the sprocket wheel) have a pointed and sharply outwardly tapering profile (see FIG. 8) to provide converging lateral teeth surfaces 13d—13d. Normally, sprocket wheel teeth have little or no taper. The sprocket wheel teeth in longitudinal section have a relatively small taper and have blunt ends.

When the confronting sections 37a—37a of the film are moved edgewise into the narrow film-receiving slots or passages between the sprocket wheel and the guide wall surfaces 12—12, the tension placed on the film will cause the edges of the film to engage the outwardly facing sharply tapering surfaces 13d of the sprocket wheel teeth, and, as the film is pushed further into these slots or passages, the film readily slides along these surfaces until the film abuts positioning shoulders 39 (FIG. 5) formed at each end of the guide wall surfaces 12—12. In this position, the sprocket wheel teeth will be aligned with the center line of the film perforations so that rotation of the sprocket wheel will cause movement of the film. The sharply inclined inner surfaces 13d of the sprocket teeth enables the film readily to be pulled from engagement with the sprocket wheel and out of the film-receiving slots when it is desired to remove the film from the viewer before the film has been completely wound around the take-up reel 8.

The sprocket wheel is held in place on the viewer body by a strap member 45 which has a hub portion 54a with an opening 45b therein adapted to fit loosely around the split end 13e of the sprocket wheel. The sprocket member 45 has a pair of laterally extending legs 45c—45d adapted frictionally to engage correspondingly sized openings 47a—47a' formed in narrow raised bosses 47—47' projecting from the body member near the ends of the narrow viewer body recess 4b–2. The hub portion 45a of the strap member is contiguous to the outwardly facing end of the enlarged portion 13b of the sprocket wheel to prevent the same from being moved readily from the body member when the strap member is in place. The hub portion 45a of the strap member is illustrated as extending beyond the periphery of the sprocket wheel teeth to narrow the spaces available for insertion of the confronting sections 37a—37a into the viewer body recess 4b–2 where they engage the sprocket wheel (FIG. 7), but this poses no problem because the tension placed on the film in the manner explained above draws the film against the sprocket wheel teeth once the film clears the hub portion 45a of the strap member.

The split projecting ends 13e, 33 and 36b of the sprocket wheel and the take-up and supply reels are designed to receive the narrow flat ended portion 41a of a crank unit 41. The flat ended portion 41a of the crank unit extends from a hub 41b. A crank arm 41c is connected to the hub 41b and terminates in a handle 41d. The flat ended portion 41a of the crank unit is designed snugly to fit into the split projecting ends of the sprocket wheel and the supply and take-up reels. When inserted into the end of the sprocket wheel, rotation of the crank unit will impart rotation to the take-up reel 8 as well as the sprocket wheel due to the coupling therebetween afforded by the rubber band 21. The crank unit is inserted into the split end of the supply reel 7 when it is desired to rewind the film from the take-up reel onto the supply reel. There are some occasions where it is desirable to place the crank unit into the split end of the take-up reel to rotate the same, as when it is desired to partially wind the film on the take-up reel prior to insertion of the film into the narrow recess 4b–2 of the viewer body.

The semi-hour glass-shaped recess 4b–1 of the viewer body opens at its forward end into a generally rectangularly shaped recess 4b–4. The inner defining wall of the recess 4b–4 identified by reference character 52 has a transverse groove 54 at the rear end thereof which extends at right angles to the axis of symmetry of the semi-hour glass-shaped recess 4b–1 and defines the point of junction of this recess and the rectangular recess 4b–4. Positioned just forwardly of the central portion of the groove 54 is a segmental cylindrical indentation 56 which joins an adjacent segmental cylindrical indentation 58 of lesser radius than the indentation 56 but coaxially related with respect thereto. The front side wall 6c of the viewer body has a semi-cylindrical opening 60 formed therein which has the same diameter and is concentric with the axis of the segmental cylindrical indentation 58. The front wall 6c extends to the level of the raised portion 4b' of the front section of the viewer body. A transverse groove 62 is located between the front end of the segmental cylindrical indentation 58 and the front wall 6a'.

A film track and eyepiece assembly 65 is removably attached to the front end of the viewer body. The assembly includes an eyepiece 63 which has a hollow cylindrical neck portion 63a at the rear thereof and a relatively large cup-shaped eyepiece-forming portion 63b at the front thereof which opens into the hollow interior of the neck portion 63a. A suitable magnifying lens 64 is mounted in the outer end of the neck portion 63a. A hollow flanged member 66 telescopes within the rear end of the neck portion 63a of the eyepiece and makes a friction fit therewith. The member 66 has a flange 66a at the rear thereof.

The neck portion 63a of the eyepiece is slidably disposed within the segmental cylindrical indentation 58 in the viewer body and the defining walls of the opening 60 of the front wall 6c of the viewer body. The flange 66a of the member 66 fits in the larger indentation 56 of the viewer body. The eyepiece 63 is slidable in and out of the viewer body to the extent permitted by the flange abutment shoulders 56a—56a (FIG. 5) at the juncture of the indentations 56 and 58. The eyepiece is adjustable in this manner for focusing purposes.

A film track-forming member 70 is provided having a generally elongated rectangular shape, and one longitudinal edge thereof 70a fits within the groove 54 at the rear of the rectangular recess 4b–4. The film track-forming member 70 has a longitudinal rib 70b spaced a short distance from the other longitudinal edge of the wall. A rectangular viewing opening 70c is formed in the central portion of the film tracking-forming member, the central point of which is intercepted by the coaxial axes of the segmental cylindrical indentations 56 and 58. The film track-forming member 70 also has a film holding nipple 70d on the rear surface thereof adjacent to but spaced from the upper or outlet end of the film track-forming member. The film holding nipple is positioned near the top of the member 70 to intercept perforations of the film passing along the film track-forming member in a manner to be explained. The nipple preferably has a flat downwardly facing film holding shoulder 70e which engages the lower edge of the perforation into which the nipple extends.

The eyepiece 63 and the film track-forming member 70 are held in position on the viewer body by a clamping member generally indicated by reference numeral 73. The clamping member has side walls 73a—73a having slots 73b—73b in the rear end thereof adapted to fit over the rib 70b on the film track-forming wall member 70. The clamp member has a front wall 73c with a semicircular opening 73d corresponding to the semicircular opening 60 in the front wall 6c of the viewer body and a pair of segmental cylindrical indentations 73e and 73f having a size and position corresponding respectively to the size and position of the segmental cylindrical indentations 56 and 58 in the viewer body and having a common axis therewith. The clamp member 73 has a pair of resilient arms 73g—73g having short outwardly extending flanges 73h—73h on the ends thereof.

When the arms are compressed inwardly slightly, they can be passed through the correspondingly positioned openings 77—77 (FIG. 5) in the viewer body. When the arms 73g—73g are released, they snap outwardly and the flanges 73h—73h on the ends thereof securely lock the clamp member in place on the viewer body. To prevent a loose fit between the eyepiece 63 and the clamping member 73, a short length of spring wire 80' is positioned within the groove 62 at the front of the viewer body, the spring metal wire 80' before insertion of the eyepiece 63 passing into the area of the circle bounded in part by the cylindrical indentation 58 of the viewer body and the semicircular opening 60 in the front wall 6c of the viewer body. When the eyepiece 63 is inserted into the viewer body, and the clamp member 73 is secured in place over the eyepiece, the clamp member forces the eyepiece against the spring metal wire 80' which then resiliently holds the eyepiece and clamp member 73 securely together, while permitting the eyepiece to be adjusted axially in position for proper focusing.

When the film track-forming member 70 is placed on the viewer body and anchored thereto by the clamp member 73, a film-receiving channel is defined between the inwardly facing surface 70b' (FIG. 4) of the rib 70b on the rear face of the film track-forming member 70 and the viewer body. This surface 70b' is inclined inwardly so that the channel has its smallest width adjacent the rear surface of the member 70. At this point the film just fits the channel. The rear surface of the film track-forming member inside of the rib 70b is exposed for its full extent, and this enables the film readily to be positioned against the film track-forming wall member merely by forming a sufficiently large loop that the front end there portioned is flattened by the member 70. The resiliency of the film keeps the film in a snug relation to the flat rear surface of the member 70. When the film is so positioned, the film holding nipple 70d passes within one of the perforations of the film as shown in FIG. 14.

The means for effecting an intermittent movement of the film along the film track-forming member 70 as the sprocket wheel 13 is rotated continuously includes the aforementioned film holding nipple 70d operating in conjunction with a spring 82. The spring 82 preferably is a conical coil spring, the narrow end thereof frictionally engaging the walls of a mounting post 84 projecting from the viewer body. The film leaving the outlet end of the channel formed by the film track-forming member 70 passes around the upper or outer side of the conical coil spring 82 and is engaged by the wide end thereof at a point positioned outside of the path of movement of the picture frames thereof, as best seen in FIG. 4. In this way, the contact of the spring with the film cannot damage the picture frame containing portions of the film.

The manner in which the intermittent movement of the film along the film gate-forming walls 70 one frame at a time is achieved can be seen by referring to FIGS. 14–16. As the sprocket wheel 13 is rotated continuously in a clockwise direction as viewed in FIG. 1, the upper section of the film loop is pulled against the coil spring to compress the same while the bottom section of the film loop gains additional slack. As the conical spring compresses under the tension applied to the upper section of the film loop, the film is progressively pulled away from the rear surface of the film track-forming member 70 at the outlet end of the channel formed thereby, which is the location of the film holding nipple 70d (FIG. 15). As soon as the film pulls completely away from the nipple (FIG. 16), the spring tension built up by the compression of the coil spring will immediately force the film outwardly, and momentarily a small length of film equal to one frame length is moved longitudinally of the film track-forming member 70 until the upper portion of the film once again passes over the film holding nipple 70d. The shoulder 70e of the nipple then once again acts as a holding surface preventing the film from being further moved longitudinally along the film track-forming member until the film is once again pulled against a coil spring to a sufficient degree to compress the same to the point shown in FIG. 15 where the film again clears the nipple 70d.

Light is directed from the rear side of the film through the viewing window 70c of the film track-forming member 70 and the eyepiece 63 by an angularly truncated projection 80 centrally positioned within the loop-receiving recess 4b-1 of the viewer body member. This projection has a forwardly and downwardly inclining flat surface 80a which is colored white to form a good light reflecting surface. The ambient light is reflected by this white colored surface 80a through the viewing window 70c and then through the eyepiece 63.

The various parts of the viewer described may be made of molded synthetic plastic material with modest tolerances. It is a remarkable fact that a movie film viewer so simply and inexpensively constructed can operate reliably to produce the required one film frame intermittent advancement of the film.

It should be understood that numerous modifications may be made in the preferred form of the invention described above without deviating from the broader aspects of the invention.

What I claim as new and desire to protect by Letters Patent of the United States is:

1. In a manually operable movie film viewer including supply reel receiving means for supporting a supply reel with perforated movie film for rotation about a first axis, take-up reel means for supporting a take-up reel for rotation about a given axis and a film track-forming wall against which the film is urged, the wall having an inlet end and an outlet end, there being clearance space for the film to move away from said wall at least near said outlet end thereof, said film track-forming wall having an opening therein forming a viewing window between said inlet and outlet ends thereof for viewing a frame of the section of the film mounted against said wall, the improvement in means for intermittently advancing said film along said film track-forming wall in a step-by-step motion, said means comprising: a nipple projecting from said film track-forming wall adjacent the outlet end thereof for entering a perforation of the section of the film positioned against said wall, said nipple having a stop shoulder on the leading edge thereof for engaging the defining edge of the film perforation for preventing movement in a direction parallel to the wall, a conical coil spring having its axis parallel to said film track-forming wall and positioned adjacent the outlet end of said film track-forming wall where the section of the film leaving the outlet end of said film track-forming wall engages the wide end thereof and when compressed a given amount by a pull on said section of the film, permitting the film to pull away from said nipple to enable return of the spring to its initial position and momentarily moving the film one frame length along said wall before re-engagement of the nipple with the film, hand windable means for engaging the perforations of the film and pulling on the section of the nipple held portion of the film extending around said coil spring to compress the coil spring said given amount while, at the same time, pushing an equivalent amount on the section of the film moving toward the inlet end of the film track-forming wall to provide slack in the film, and means responsive to the rotation of said hand windable means for rotating said take-up reel receiving means to wind the film thereon.

2. The device of claim 1 wherein the outermost portion of said conical coil spring engages the film at points positioned out of the path of movement of the picture forming areas of the film.

3. A manually operable movie film viewer comprising: a body member having a vertical support wall having a rear reel support section with a supply of reel-receiving post extendings horizontally from the right side of the wall and a take-up reel-receiving post spaced from said supply reel-receiving post and extending horizontally from said right side of the support wall, a pair of spaced confronting guide wall surfaces extending horizontally from said right side of the wall, and acting as guides for holding spaced sections of the film leaving the supply reel and approaching the take-up reel in confronting relation, a sprocket wheel mounted between said guide wall surfaces, the sprocket wheel having teeth for engaging with the defining edges of the perforations of said confronting sections of the film, manually operable means for selectively rotating said supply reel-receiving post alone or said sprocket wheel and take-up reel-receiving post together, said support wall having an outwardly expanding recess on the right side thereof communicating with the space between said guide wall surfaces and accommodating a loop formed in the sections of the film leaving said confronting guide wall surfaces, a film track wall at the front end of said recess for receiving the end of said loop and having a film inlet and a film outlet end, a window formed in said film track wall for viewing a frame of the film passing along said wall, a viewing lens on the front of said body for viewing the frame visible in said window, means for directing light through the film into said viewing window, said means being located within said recess in said support wall for directing light through said viewing window, and means constraining the movement of the film along said film track wall to an intermittent frame-by-frame movement past said viewing window.

4. A manually operable movie film viewer comprising: a body member having a vertical support wall having a rear reel support section with a supply reel-receiving post extending horizontally from the right side of the wall and a take-up reel-receiving post spaced from said supply reel-receiving post and extending horizontally from said right side of the support wall, said body having a top and bottom hand grip-forming portion at the front thereof for enabling the body to be grasped between the thumb and other fingers of the left hand, a pair of spaced confronting guide wall surfaces extending horizontally from said right side of said support wall and acting as guides for holding spaced sections of the film leaving the supply reel and approaching the take-up reel in confronting relation, a sprocket wheel mounted between said guide wall surfaces, the sprocket wheel having teeth for engaging with the defining edges of the perforations of said confronting sections of the film, manually operable means for selectively rotating said supply reel-receiving post alone or said sprocket wheel and take-up reel-receiving post together, said support wall having an outwardly expanding recess on the right side thereof communicating with the space between said guide wall surfaces and accommodating a loop formed in the section of the film leaving said confronting guide wall surfaces, a film track wall at the front end of said recess for receiving the end of said loop and having a film inlet and a film outlet end, the film track wall being exposed for its full length readily to receive the front end of the loop which is maintained in a flattened condition thereagainst by the resiliency of the film, a window formed in said film track wall for viewing a frame of the film passing along said wall, a viewing lens on the front of said body for viewing the frame visible in said window, means for directing light through the film into said viewing window, said means being located within said second recess in said support wall for directing light through said viewing window, and means constraining the movement of the film along said film track wall to an intermittent frame-by-frame movement past said viewing window.

5. A manually operable movie film viewer comprising: a body member having a vertical support wall having a rear reel support section with a supply reel-receiving post extending horizontally from the right side of the wall and a take-up reel-receiving post spaced from said supply-reel receiving post and extending horizontally from said right side of the support wall, said body having a top and bottom hand grip-forming portions at the front thereof enabling the body to be grasped between the thumb and other fingers of the left hand, a pair of spaced confronting guide wall surfaces extending horizontally from said right side of the wall between the front and rear of the body, said confronting guide wall surfaces having concave central portions together defining a generally circular segmental opening and each merging with convexly curved film-engaging end portions, said film-engaging end portions of said guide wall surfaces being spaced along respective lines extending generally transversely of a line extending between said reel-receiving posts and acting as guides for holding spaced sections of the film leaving the supply reel and approaching the take-up reel in confronting relation, a sprocket wheel mounted in said circular segmental opening defined by the confronting concave portions of the guide wall surfaces, the sprocket wheel having teeth for engaging with the defining edges of the perforations of said confronting sections of the film, said support wall having at the front thereof a second recess on the right side thereof whose defining walls form an outwardly expanding continuation of the convexly curved film-engaging end portions of said guide wall surfaces on the side thereof remote from said supply and take-up reel-receiving posts, said second recess accommodating a loop formed in the section of the film leaving said confronting guide wall surfaces, a film track wall at the front end of said second recess for receiving the end of said loop and a film inlet and a film outlet end, the film track wall being exposed for its full length readily to receive the front end of the loop which is maintained in a flattened condition thereagainst by the resiliency of the film, a window formed in said film track wall for viewing a frame of the film passing along said wall, a viewing lens on the front of the body for viewing the frame visible in said window, means for directing light through the film into said viewing window, said means being located within said second recess in said support wall for directing light through said viewing window, manually operable means for rotating said sprocket wheel and said take-up reel-receiving post simultaneously for winding the film on the reel and pulling the section of the film leaving the outlet end of said film wall against said spring means and pushing on the section of the film entering the inlet end of said film track wall to form slack thereof, and means constraining the movement of the film along said film track wall to an intermittent frame-by-frame movement past said viewing window.

6. A manually operable movie film viewer comprising: a body member having avertical support wall having a rear reel support section with a supply reel-receiving post extending horizontally from the right side of the wall and a take-up reel-receiving post spaced from said supply-reel receiving post and extending horizontally from said right side of the support wall, said body having a top and bottom hand grip-forming portions at the front thereof enabling the body to be grasped between the thumb and other fingers of the left hand, a pair of spaced confronting guide wall surfaces extending horizontally from said right side of the wall between the front and rear of the body, said confronting guide wall surfaces having concave central portions together defining a generally circular segmental opening and each merging with convexly curved film-engaging end portions, said film-engaging end portions of said guide wall surfaces being spaced along respective lines extending generally transversely of a line extending between said reel-receiving posts and acting as guides for holding spaced sections of the film leaving the supply reel and approaching the take-up reel in confronting relation, a sprocket wheel mounted in said circular segmental opening defined by the confronting concave portions of the guide wall surfaces, the sprocket wheel having teeth for engaging with the defining edges of the perforations of said confronting sections of the film, said support wall having at the front thereof a second recess on the right side thereof whose defining walls form an outwardly expanding continuation of the convexly curved film-engaging end portions of said guide wall surfaces on the side thereof removed from said supply and take-up reel-receiving posts, said second recess accommodating a loop formed in the section of the film leaving said confronting guide wall surfaces, a film track wall at the front end of said second recess for receiving the end of said loop and a film inlet and a film outlet end, the film track wall being exposed for its full length readily to receive the front end of the loop which is maintained in a flattened condition thereagainst by the resiliency of the film, a window formed in said film track wall for viewing a frame of the film passing along said wall, a viewing lens on the front of the body for viewing the frame visible in said window, means for directing light through the film into said viewing window, said means being located within said second recess in said support wall for directing light through said viewing window, spring means adjacent the outlet end of said film track wall, stop means for normally preventing movement of the film parallel to said film track wall, manually operabe means for rotating said sprocket wheel and said take-up reel-receiving post simultaneously for winding the film on the reel and pulling the section of the film leaving the outlet end of said film track wall against said spring means and pushing on the section of the film entering the inlet end of said film track wall to form slack thereof, the deflection of said spring means a given amount releasing said film momentarily from said stop means, the spring then returning to its initial position advancing the film one frame position along the film track-forming wall.

7. In a movie film utilizing device including supply reel receiving means for supporting a supply reel with perforated movie film for rotation about a first axis, and film abutment wall means against which the film is urged, the film abutment wall means having an inlet end portion and an outlet end portion, there being clearance space for the film to move away from said abutment wall means at least near said outlet end portion thereof, a light passage window between said inlet and outlet ends of said film abutment wall means, the improvement in means for intermittently advancing said film along said film abutment wall means in a step-by-step motion, said means comprising: a projection adjacent the outlet portion of said film abutment wall means for entering a perforation of the film, said projection having a stop shoulder on the leading edge thereof for engaging the defining edge of a film perforation for preventing movement in a direction parallel to the film abutment wall means, a conical coil spring having its axis parallel to said film abutment wall means and positioned adjacent the outlet end of said film abutment wall means where the section of the film leaving the outlet end portion of said wall means engages and passes around the wide end thereof and, when compressed a given amount by a pull on said section of the film, permitting the film to pull away from said projection to enable return of the conical coil spring to an initial uncompressed condition and the momentary movement of the film one frame length along said wall means before re-engagement of the projection with the film, and film feeding means for engaging the perforations of the film and pulling on the section of the projection held portion of the film extending around said conical coil spring to compress the conical coil spring said given amount and effect movement of the next frame of the film into position opposite said window.

References Cited by the Examiner

UNITED STATES PATENTS

| | | | |
|---|---|---|---|
| 2,490,920 | 12/1949 | Roisman | 352—129 |
| 2,516,678 | 7/1950 | Coffey | 352—129 |
| 2,520,410 | 8/1950 | Jelinek | 40—86 X |
| 2,748,650 | 6/1956 | Melton | 40—86 X |

FOREIGN PATENTS

| | | |
|---|---|---|
| 891,495 | 9/1959 | Germany. |
| 1,062,953 | 8/1959 | Germany. |

JULIA E. COINER, *Primary Examiner.*

LAWRENCE CHARLES, *Examiner.*

WILLIAM H. GRIEB, *Assistant Examiner.*